United States Patent
Heo et al.

(10) Patent No.: US 8,321,129 B2
(45) Date of Patent: Nov. 27, 2012

(54) METHOD AND APPARATUS FOR AUTOMATICALLY OPTIMIZING AND SETTING A GPS RECEPTION PERIOD AND MAP CONTENTS

(75) Inventors: Dong-Kyu Heo, Suwon-si (KR); Jin-Won Kim, Seoul (KR); Keun-Ho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 12/587,300

(22) Filed: Oct. 5, 2009

(65) Prior Publication Data

US 2010/0114483 A1    May 6, 2010

(30) Foreign Application Priority Data

Nov. 3, 2008  (KR) .................. 10-2008-0108560

(51) Int. Cl.
*G01C 21/34* (2006.01)
(52) U.S. Cl. .................... 701/533; 701/469; 342/357.21
(58) Field of Classification Search .................. 701/469, 701/532, 533; 342/357.21, 357.23
See application file for complete search history.

(56) References Cited

U.S. PATENT DOCUMENTS

| | | | |
|---|---|---|---|
| 2002/0183927 A1* | 12/2002 | Odamura ....................... | 701/213 |
| 2003/0052797 A1* | 3/2003 | Rock et al. .................... | 340/936 |
| 2004/0073364 A1* | 4/2004 | Jung et al. .................... | 701/213 |
| 2004/0181335 A1* | 9/2004 | Kim et al. ..................... | 701/207 |
| 2008/0270024 A1* | 10/2008 | Huang et al. .................. | 701/207 |
| 2009/0119003 A1* | 5/2009 | Takeda .......................... | 701/200 |

* cited by examiner

*Primary Examiner* — Helal A Algahaim

(57) ABSTRACT

A method and apparatus for Global Positioning System (GPS) navigation is configured to automatically set an optimal GPS reception period and optimal map contents according to a moving speed of a user in a navigation system using a GPS terminal. When the moving speed of the user is considered, power efficiency is increased by optimizing a GPS reception period in terms of hardware and system load is decreased by reducing an unnecessary system operation in terms of software. User convenience is maximized by optimizing map contents requested by the user according to a moving speed in real time and displaying the optimized map contents.

22 Claims, 8 Drawing Sheets

METHOD AND APPARATUS FOR AUTOMATICALLY OPTIMIZING AND SETTING A GPS RECEPTION PERIOD AND MAP CONTENTS

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Nov. 3, 2008 and assigned Serial No. 10-2008-108560, the disclosures of which are incorporated herein by reference.

TECHNICAL FIELD OF THE INVENTION

The present invention relates generally to a navigation system having a Global Positioning System (GPS) receiver, and in particular, to a navigation method and system for providing a navigation service by considering a moving speed.

BACKGROUND OF THE INVENTION

In general, GPS is widely used to check a current position and moving speed or to track moving routes of various moving objects such as a ship, an airplane, and a car. The GPS receives radio waves indicating latitude, longitude, and altitude from a plurality of artificial satellites and then computes a current position and speed of a moving object.

A navigation system displays a current position of a moving object computed using information received in a predefined period from the GPS on a map displayed on a screen, and provides a user with various navigation information such as a traveling direction, a moving speed, and so forth.

The navigation system provides various types of location-based services such as traffic situation guidance and Point Of Interest (POI) information guidance for providing a detailed information guide about telephone numbers and addresses of a restaurant, a bank, a gas station, a shop, and the like.

Usually, existing navigation terminals have a car navigation function, which receive GPS signals from a plurality of artificial satellites in a fixed GPS reception period proper for a car.

That is, the GPS signals are received in the same reception period without considering a moving speed of a user.

Accordingly, when a navigation terminal having a GPS reception period proper for a car moves at a slow speed like a pedestrian, a redundant GPS signal is unnecessarily received, thereby increasing system load and reducing power efficiency. Conversely, when a navigation terminal having a GPS reception period proper for the pedestrian moves at a fast speed like the car, position-tracking continuity decreases and an actual moving route error increases.

Also, map contents support a fixed map regardless of a moving speed of a user. However, map content requirements are significantly different between a pedestrian navigation system and a car navigation system. For example, a car navigation map is enough even though only rough information about large buildings and main facilities is displayed, but a pedestrian navigation map needs to provide detailed information about park roads, subway entrances, surrounding facilities, and the like. Since the existing GPS terminals provide only a predefined map, the above-described requirements are not met.

Terminals for supporting both a car and a pedestrian are emerging, which are inconvenient in that a pedestrian or car mode must be manually set according to use purpose. Since GPS signals are received in a fixed GPS period without considering a moving speed of a user, system load increases and power efficiency decreases.

Therefore, a need exists for a method capable of increasing power efficiency and maximizing user convenience by automatically providing an optimized navigation system according to a moving speed of a navigation terminal user.

SUMMARY OF THE INVENTION

To address the above-discussed deficiencies of the prior art, it is a primary object of the present invention to address at least the problems and/or disadvantages and to provide at least the advantages described below. Accordingly, one aspect of exemplary embodiments of the present invention is to provide a GPS signal reception method for automatically setting an optimal GPS reception period by considering a moving speed of a user, and a navigation system for supporting the same.

Another aspect of exemplary embodiments of the present invention is to provide a navigation method and system for automatically setting optimal map contents by considering a moving speed of a user.

According to one aspect of exemplary embodiments of the present invention, there is provided a method for automatically optimizing and setting a GPS reception period in a navigation system using a GPS terminal, including: measuring a current speed of the GPS terminal using a GPS signal received through a GPS sensor; determining whether a first GPS reception period in which the GPS signal is received through the GPS sensor is the same as a second GPS reception period corresponding to the measured speed of the GPS terminal and changing the first GPS reception period to the second GPS reception period when the first GPS reception period is different from the second GPS reception period; and feeding back the changed GPS reception period to the GPS sensor.

According to another aspect of exemplary embodiments of the present invention, there is provided a method for automatically optimizing and setting map contents in a navigation system using a GPS terminal, including: measuring a current speed of the GPS terminal using a GPS signal received through a GPS sensor; determining whether first map contents displayed on a display are the same as second map contents corresponding to the measured speed of the GPS terminal and changing the first map contents to the second map contents when the first map contents are different from the second map contents; and feeding back the changed map contents to a map content controller.

According to further another aspect of exemplary embodiments of the present invention, there is provided a method for automatically optimizing and setting a GPS reception period and map contents in a navigation system using a GPS terminal, including: measuring a current speed of the GPS terminal using a GPS signal received through a GPS sensor; determining whether a first GPS reception period in which the GPS signal is received through the GPS sensor is the same as a second GPS reception period corresponding to the measured speed of the GPS terminal and changing the first GPS reception period to the second GPS reception period when the first GPS reception period is different from the second GPS reception period; feeding back the changed GPS reception period to the GPS sensor; determining whether first map contents displayed on a display are the same as second map contents corresponding to the measured speed of the GPS terminal and changing the first map contents to the second map contents when the first map contents are different from the second map contents; and feeding back the changed map contents to a map content controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged navigation system.

Exemplary embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention proposes a navigation system and method for automatically setting an optimal GPS reception period and optimal map contents according to a moving speed of a user using a navigation terminal in the navigation system. Accordingly, a method for automatically setting a GPS reception period and a method for automatically setting map contents according to exemplary embodiments of the present invention will be described in detail.

Figure 1:
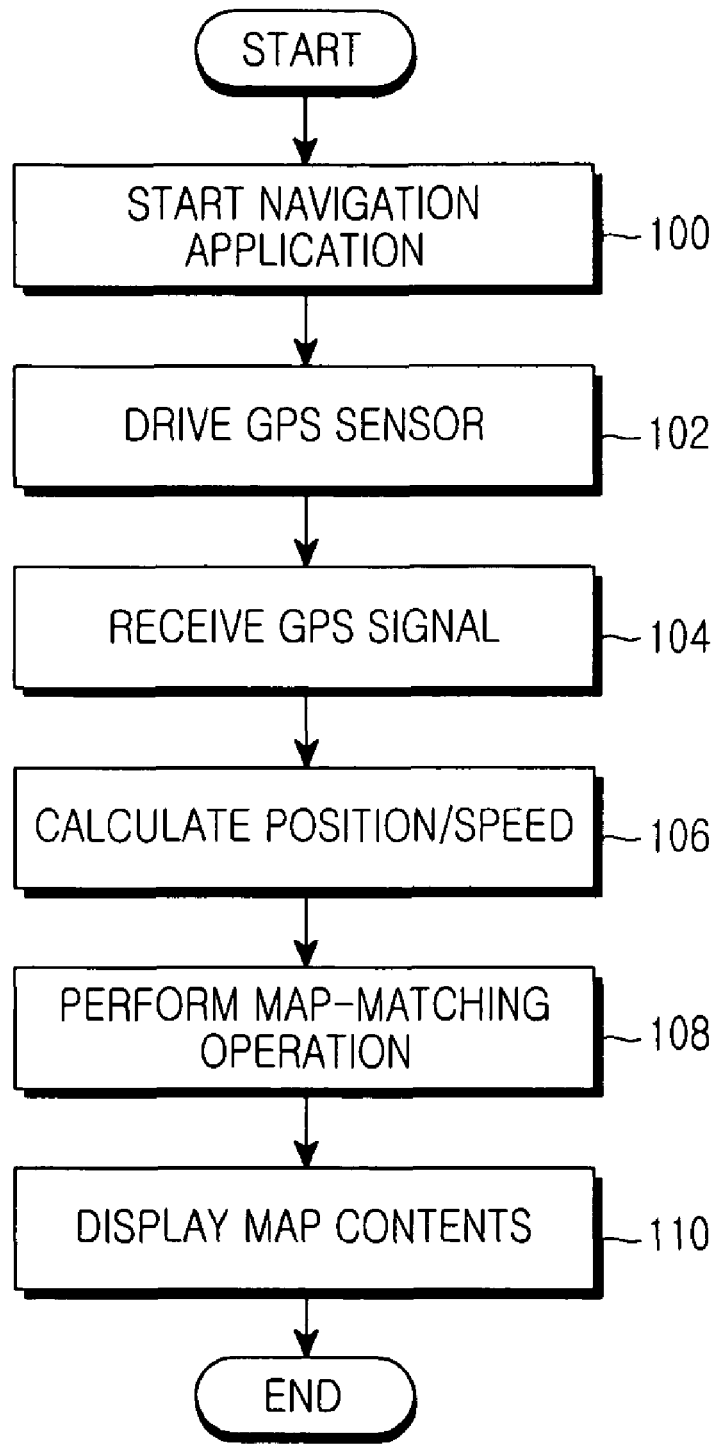
FIG. 1 illustrates a flowchart of a conventional navigation system.

FIG. 1 illustrates a flowchart of a conventional navigation system. The navigation system illustrated in FIG. 1 can be a car or pedestrian navigation system or a manual navigation system capable of supporting both a car mode and a pedestrian mode. A GPS receiver is mounted inside or outside a GPS terminal so that the GPS terminal measures its own current position and speed. When the entire map information of a map to be used in the GPS terminal is embedded in a memory, or not embedded in a memory, a proper map including a position of each GPS terminal is downloaded from a server or an external device. Now, a process of the conventional navigation system will be described in detail.

Referring to FIG. 1, a user starts a navigation application through a user input unit of a GPS terminal in step 100. When a start input is received from the user, the application performs various initialization processes for operating navigation. When the car or pedestrian mode is previously or manually set by the user through the user input unit according to use purpose after the initialization processes are completed, a GPS driver drives a GPS sensor in step 102.

When step 102 is completed, the GPS sensor receives a GPS signal from an artificial satellite in a fixed GPS reception period in step 104. When step 104 is completed, a position/speed calculator computes a current position and speed of the GPS terminal from the received GPS signal and then acquires position and speed data/information in step 106.

The GPS terminal matches the current position to a position on a map using the position and speed data/information. The matched map is a predefined map for a car or pedestrian according to a fixed manual mode. When the map for the car or pedestrian is determined, a map-matching operator exactly displays information about a position and POI of the user on the map through a map-matching operation in step 108. When step 108 is completed, a display provides the user with map contents acquired through the map-matching operation in step 110.

Hereinafter, exemplary embodiments of the present invention will be described in detail with reference to the annexed drawings.

A method for optimizing a GPS reception period and a method for optimizing the display of map contents, by considering a moving speed of a GPS terminal, according to exemplary embodiments of the present invention will be separately described. First, the method for optimizing the GPS reception period by considering the moving speed of the GPS terminal according to an exemplary embodiment of the present invention will be described in detail.

Figure 2:
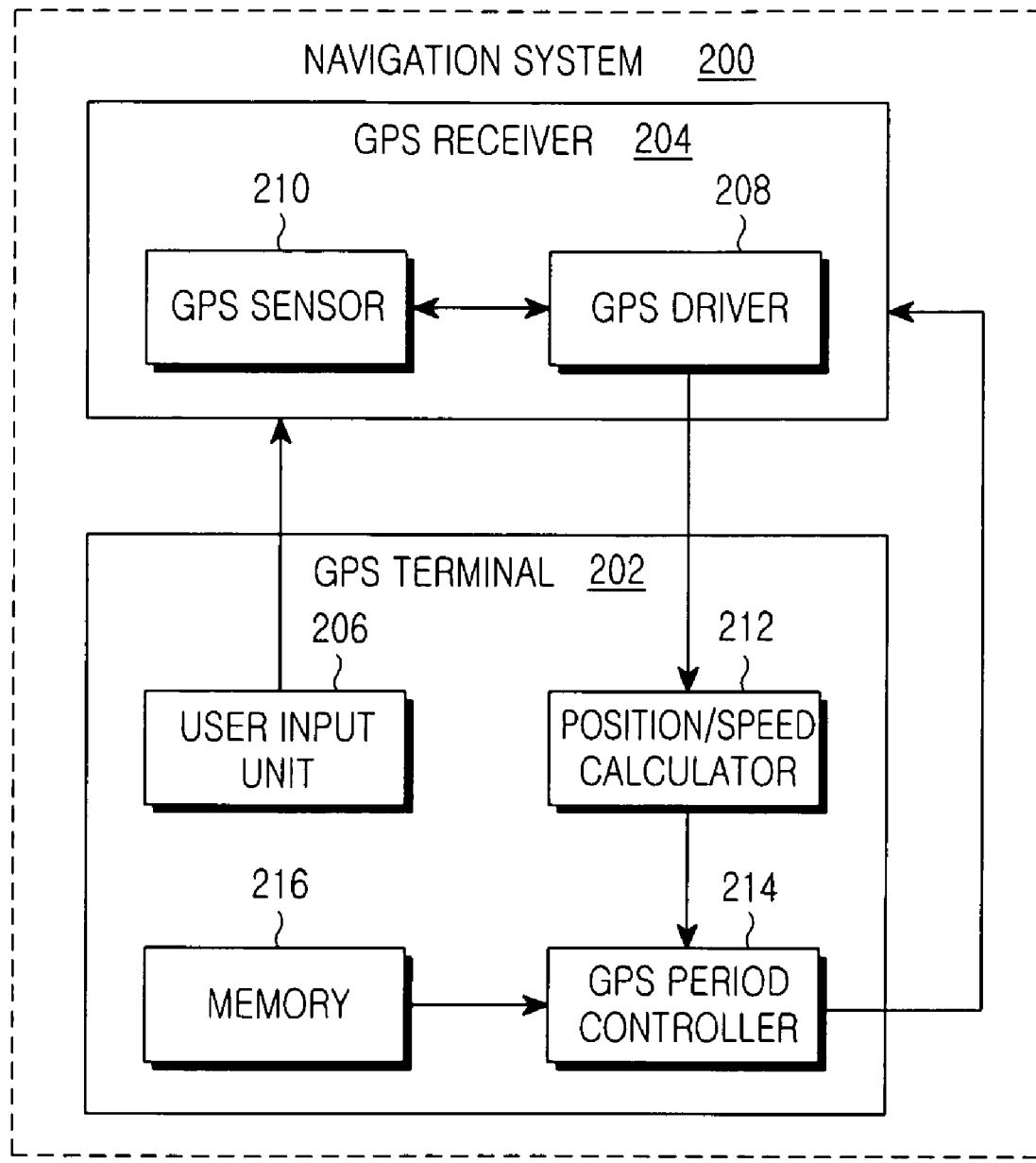
FIG. 2 illustrates a block diagram of a navigation system for automatically updating a GPS reception period according to an exemplary embodiment of the present invention.

FIG. 2 illustrates a block diagram of a navigation system for automatically updating a GPS reception period according to an exemplary embodiment of the present invention.

Referring to FIG. 2, a navigation system 200 includes a GPS terminal 202 and a GPS receiver 204. The GPS receiver 204 includes a GPS sensor 210 and a GPS driver 208. The GPS terminal 202 includes a user input unit 206, a position/speed calculator 212, a GPS period controller 214, and a memory 216. A description of operations of the above-described elements not directly required for explaining the present invention is omitted.

The user input unit 206 receives a request for starting the navigation system 200 from the user and then provides the request to the GPS receiver 204 and the GPS terminal 202. The GPS receiver 204 and the GPS terminal 202 perform an initialization process for performing a navigation function in response to the start request from the user. When the initialization process is completed, the navigation system 200 starts an operation for providing the navigation function.

The GPS driver 208 controls the overall operation of the GPS receiver 204. Specifically, the GPS driver 208 controls the GPS sensor 210 to receive a GPS signal in a set GPS reception period. The GPS reception period is set to one of an initial GPS reception period and an optimized GPS reception period.

The initial GPS reception period is a default reception period to be set upon initialization of the navigation system 200, which may be a value preset when first designing the navigation system 200 or a value arbitrarily set by the user.

The optimized GPS reception period is an optimal GPS reception period corresponding to a current moving speed of the GPS terminal 202. A specific operation for setting the optimal GPS reception period will be described later.

Under control of the GPS driver 208, the GPS sensor 210 receives a GPS signal from an artificial satellite in the set GPS reception period. As described above, the GPS reception period can be one of the initial GPS reception period and the optimized GPS reception period.

The above description has been given as if the GPS sensor 210 is manually operated by the GPS driver 208. However, the GPS sensor 210 can actively operate by receiving a GPS reception period from an outside source (for example, a GPS terminal).

The GPS signal received by the GPS sensor 210 is provided to the GPS terminal 202 through the GPS driver 208. The GPS signal is provided to the position/speed calculator 212 included in the GPS terminal 202.

The position/speed calculator 212 measures a current position and speed of the GPS terminal 202 from the GPS signal. Data of the measured current speed of the GPS terminal 202 is used as an important element to determine an optimal GPS reception period. The position/speed calculator 212 provides the measured current speed data to the GPS period controller 214.

The GPS period controller 214 determines the optimal GPS reception period by the measured current speed data. Here, the optimal GPS reception period is a GPS reception period optimized by considering the current speed of the GPS terminal 202.

For example, a method using a memory table to determine an optimal GPS reception period corresponding to the measured current speed data is proposed. In this case, a structure for storing the memory table in which an optimal GPS reception period is mapped to each speed range is additionally required. FIG. 2 illustrates a structure additionally having the memory 216 for storing the memory table.

In response to a request from the GPS period controller 214, the memory 216 provides the GPS period controller 214 with an optimal GPS reception period corresponding to a current speed of the GPS terminal 202.

Table 1 shows an example of a memory table stored in the memory 216.

TABLE 1

| Speed range (km/h) | Optimal GPS reception period (sec) |
| --- | --- |
| Less than 4 km/h | 4 sec |
| 4 km/h~10 km/h | 3 sec |
| 10 km/h~20 km/h | 2 sec |
| 20 km/h~50 km/h | 1.5 sec |
| 50 km/h~80 km/h | 1 sec |
| More than 80 km/h | 0.5 sec |

As shown in Table 1, the optimal GPS reception period is 4 sec in the speed range of less than 4 km/h, 3 sec in the speed range of 4 km/h~10 km/h, 2 sec in the speed range of 10 km/h~20 km/h, 1.5 sec in the speed range of 20 km/h~50 km/h, 1 sec in the speed range of 50 km/h~80 km/h, and 0.5 sec in the speed range of more than 80 km/h.

Assuming that the current speed of the GPS terminal 202 based on the measured current speed data is 70 km/h, the optimal GPS reception period becomes 1 sec.

Table 1 is an arbitrary example for a better description of the present invention. The optimal GPS reception period corresponding to a speed range of a GPS terminal can be actually determined through various algorithms or tests.

The GPS period controller 214 determines whether a reception period (hereinafter, referred to as "first GPS reception period") currently set to receive the GPS signal is an optimal GPS reception period when considering the current speed of the GPS terminal 202.

That is, the GPS period controller 214 determines whether the optimal GPS reception period (hereinafter, referred to as "second GPS reception period) provided from the memory 216 is the same as the first GPS reception period.

When the first GPS reception period is different from the second GPS reception period, the GPS period controller 214 sets the second GPS reception period to the optimal GPS reception period. Conversely, when the first GPS reception period is the same as the second GPS reception period, the GPS period controller 214 maintains the first GPS reception period as the optimal GPS reception period.

The GPS period controller 214 provides the optimal GPS reception period to the GPS receiver 204. The optimal GPS reception period is provided to the GPS driver 208 included in the GPS receiver 204. Of course, the optimal GPS reception period can be directly provided to the GPS sensor 210 included in the GPS receiver 204.

According to the above-described operation, the reception period of the GPS receiver 204 is managed as an optimized GPS reception period corresponding to the speed of the GPS terminal 202 in real time. The GPS receiver 204 receives a GPS signal in the optimized GPS reception period corresponding to the speed of the GPS terminal 202.

Figure 5:
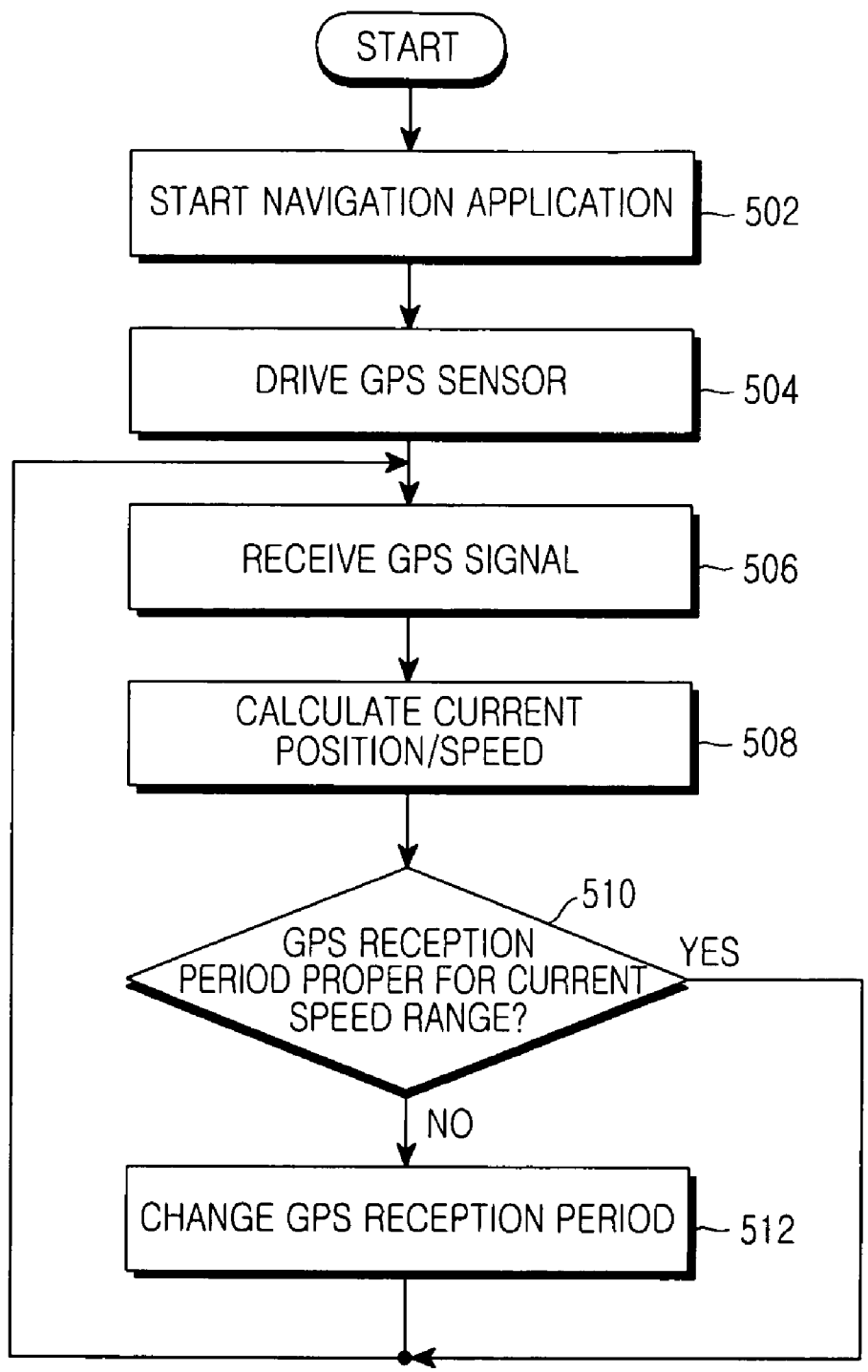
FIG. 5 illustrates a flowchart of a control process for automatically updating a GPS reception period according to an exemplary embodiment of the present invention.

FIG. 5 illustrates a flowchart of a control process for automatically updating a GPS reception period according to an exemplary embodiment of the present invention.

Referring to FIG. 5, the user starts a navigation application through the user input unit of the GPS terminal. When the application receives a start input from the user in step 502, various initialization processes for operating navigation are performed. When the initialization processes are completed, the GPS driver drives the GPS sensor to receive a GPS signal in step 504.

The GPS sensor receives the GPS signal in a set GPS reception period in step 506. The GPS reception period is set to one of an initial GPS reception period and an optimized GPS reception period.

The initial GPS reception period is a default reception period set at the initial operation time of the GPS sensor in step 504, which may be a value preset at a first design time or a value arbitrarily set by the user. The optimized GPS reception period is an optimal GPS reception period corresponding to a current moving speed of the GPS terminal.

A GPS signal is received in a GPS reception period set to a default value at the first operation time in step 506. When the GPS reception period is updated to the optimal GPS reception period according to an operation to be described later, the GPS signal is received in the optimal GPS reception period.

The GPS signal received by the GPS sensor is provided to the position/speed calculator through the GPS driver.

The position/speed calculator measures a current position and speed of the GPS terminal from the received GPS signal in step 508. When step 508 is completed, the position/speed calculator provides speed data of the GPS terminal to the GPS period controller. The GPS period controller determines whether a current GPS reception period is the optimal GPS reception period when considering the speed data of the GPS terminal in step 510. That is, it is determined whether the optimal GPS reception period corresponding to the current speed of the GPS terminal stored in the memory is the same as the current GPS reception period (the default reception period or updated GPS reception period).

When the GPS reception period in which the current GPS signal is received is not proper to be the optimal GPS reception period corresponding to the current speed of the GPS terminal, the GPS period controller updates the current GPS reception period to the optimal GPS reception period corresponding to the current speed of the GPS terminal in step 512. Conversely, when the GPS reception period in which the current GPS signal is received is proper to be the optimal GPS reception period, the current GPS reception period is maintained.

Then, the control process returns to step 506 and the optimal GPS reception period is fed back to the GPS driver or the GPS sensor. The GPS sensor receives a GPS signal in the fed-back optimal GPS reception period. The fed-back GPS reception period can be one of a changed GPS reception period and an existing GPS reception period.

An operation for optimizing a GPS reception period by repeatedly performing steps 508 to 512 is continuously performed. Thus, the GPS reception period in which the GPS signal is received is automatically updated in real time.

When a navigation system according to an exemplary embodiment of the present invention is used, the user can increase power efficiency by optimizing a GPS reception data rate in terms of hardware and decrease system load by reducing an unnecessary system operation in terms of software.

Next, a method for optimizing the display of map contents considering a moving speed of a GPS terminal according to an exemplary embodiment of the present invention will be described in detail.

In general, map contents to be used in a navigation system include a change of a map itself loaded in the memory as well as additional information and POI information displayed on the map. User-desired map contents differ according to a moving speed of the user. For example, the user, moving slowly at pedestrian speed, may require detailed information about subway entrances, parks, and surrounding facilities within an area of 50 meters. Conversely, the user, fast moving at a car speed, may require rough information about large buildings and roads. In exemplary embodiments of the present invention to be described later, an apparatus and method for automatically setting map contents by optimizing the precision of a map and additional information and POI information on the map according to a use environment of the user are proposed.

Figure 3:
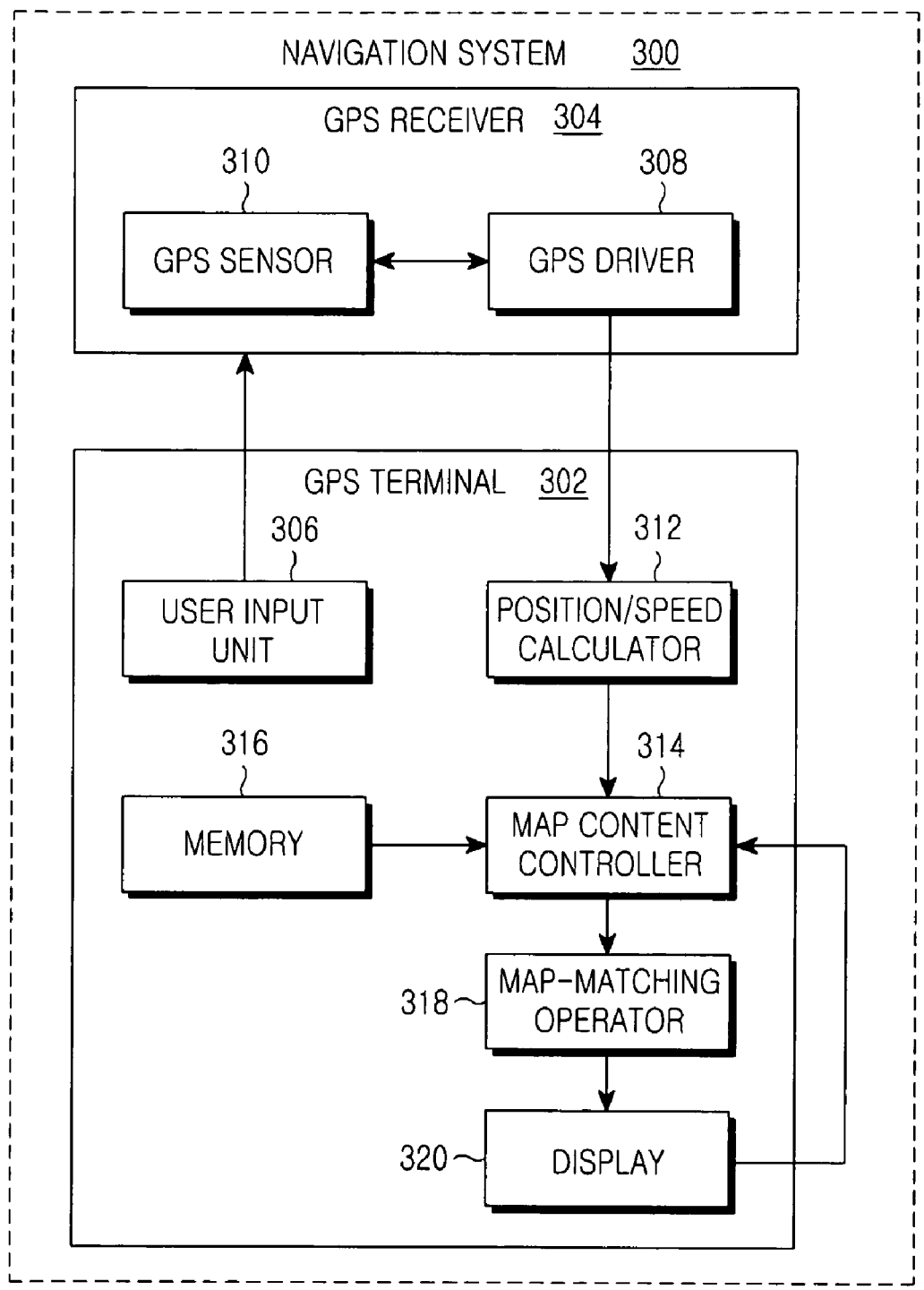
FIG. 3 illustrates a block diagram of a navigation system for automatically setting optimized map contents according to an exemplary embodiment of the present invention.

FIG. 3 illustrates a block diagram of a navigation system for automatically setting optimized map contents according to an exemplary embodiment of the present invention.

Referring to FIG. 3, a navigation system 300 includes a GPS receiver 304 and a GPS terminal 302. The GPS receiver 304 includes a GPS driver 308 and a GPS sensor 310. The GPS terminal 302 includes a user input unit 306, a position/speed calculator 312, a map content controller 314, a memory 316, a map-matching operator 318, and a display 320. A description of operations of the above-described elements not directly required for explaining the present invention is omitted.

First, the user starts a navigation application through the user input unit 306 of the GPS terminal 302. When a start input is received from the user, the application performs various initialization processes for operating navigation. When the initialization processes for operating the navigation are completed, the GPS driver 308 drives the GPS sensor 310 to receive a GPS signal. The GPS sensor 310 receives the GPS signal from a satellite in a default GPS reception period or a reception period set by the above-proposed method. The GPS signal received by the GPS sensor 310 is provided to the position/speed calculator 312 through the GPS driver 308.

The position/speed calculator 312 measures a current position and speed of the GPS terminal from the received GPS signal. Data of the measured current speed is used as an important element for determining map contents.

The position/speed calculator 312 provides the measured speed data of the GPS terminal to the map content controller 314. The map content controller 314 determines whether current map contents corresponding to the current speed of the GPS terminal are optimal. That is, it is determined whether map contents in a period in which the current GPS signal is received, that is, the current map contents, match optimal map contents corresponding to the current speed of the GPS terminal.

When the map contents are not optimized according to the current speed of the GPS terminal, the map content controller 314 changes the current map contents to the optimal map contents corresponding to the current speed of the GPS terminal. If the map contents are not optimized according to the current speed of the GPS terminal, it means that the current map contents do not match the optimal map contents corresponding to the current speed of the GPS terminal.

The optimal map contents corresponding to the current speed of the GPS terminal is accessed from the memory 316. The memory 316 pre-stores information of optimized map contents according to each speed range.

The memory 316 can be implemented by one of a method for storing the entire map data and a method for separately storing map data corresponding to each speed range. Optimized map information according to each speed range of the GPS terminal is operable to be extracted when the memory 316 is implemented by the method for storing the entire map data. The map contents can be updated by downloading map contents from a server or an external device.

Conversely, when the map contents corresponding to the current speed of the GPS terminal are optimized, the map content controller 314 maintains the current map contents. If the map contents corresponding to the current speed of the GPS terminal are optimized, it means that the current map contents match the optimal map contents corresponding to the current speed of the GPS terminal.

Figure 8A:
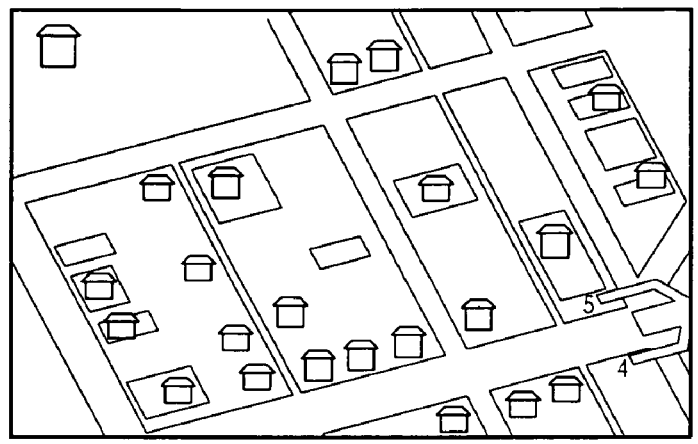
FIG. 8A illustrates map contents at a terminal speed of less than 30 km/h.
Figure 8B:
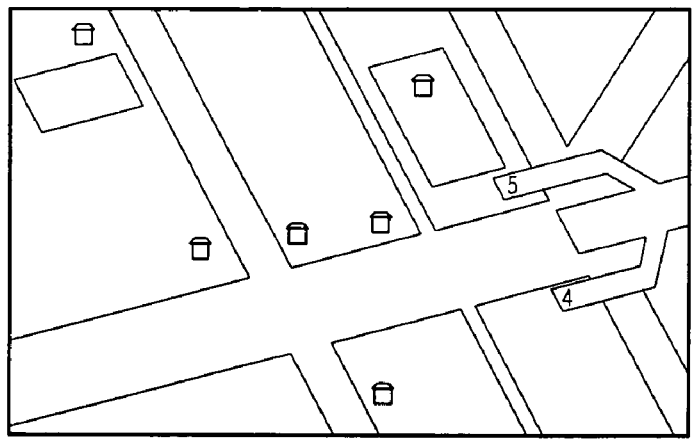
FIG. 8B illustrates map contents at a terminal speed of 30 km/h~80 km/h.
Figure 8C:
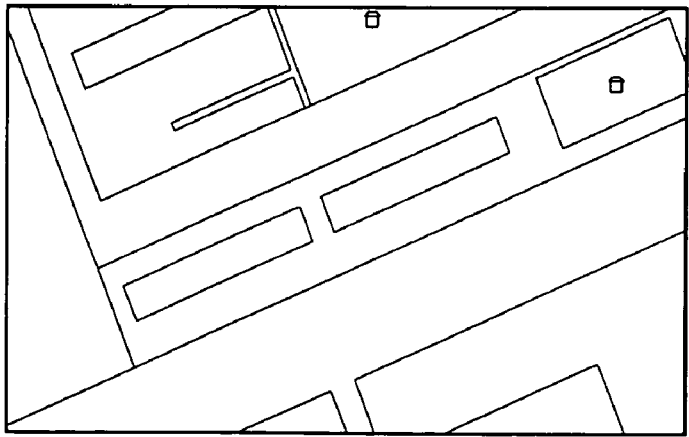
FIG. 8C illustrates map contents at a terminal speed of more than 80 km/h.

FIGS. 8A to 8C illustrate map contents according to each speed range of a GPS terminal according to exemplary embodiments of the present invention. Those skilled in the art will appreciate that map contents according to each speed range of the GPS terminal can be changed according to an algorithm, test, or consumer request.

FIG. 8A illustrates an example of a content map at a terminal speed of less than 30 km/h. Since a moving speed of the user is slow and distance information capable of being sensed is dense, the map provides detailed information about subway entrances, parks, POI, and surrounding facilities. FIGS. 8B and 8C are examples of content maps at terminal speeds of 30 km/h~80 km/h and more than 80 km/h. Only a rough map and information capable of being sensed by the user in each speed range are displayed. Of course, POI information arbitrarily set by the user can be displayed in the speed ranges.

The map content controller 314 provides the map-matching operator 318 with map contents corresponding to a current speed of the GPS terminal. The map-matching operator 318 matches the current position of the GPS terminal to a position on the map using position information provided from the position/speed calculator 312.

The map-matching operator 318 causes additional information and POI information to be displayed on the map. Map contents on which a map-matching operation is completed by the map-matching operator 318 are displayed to the user through the display 320. The map contents on which the map-matching operation is completed are fed back to the map content controller 314.

When the moving speed of the GPS terminal changes, the map content controller determines whether map contents (first map contents) displayed on the display are the same as map contents (second map contents) corresponding to the current speed of the GPS terminal. When the first map contents are different from the second map contents, the map content controller changes the first map contents to the second map contents. Accordingly, optimized map contents corresponding to the current moving speed of the GPS terminal are automatically set in real time.

Figure 6:
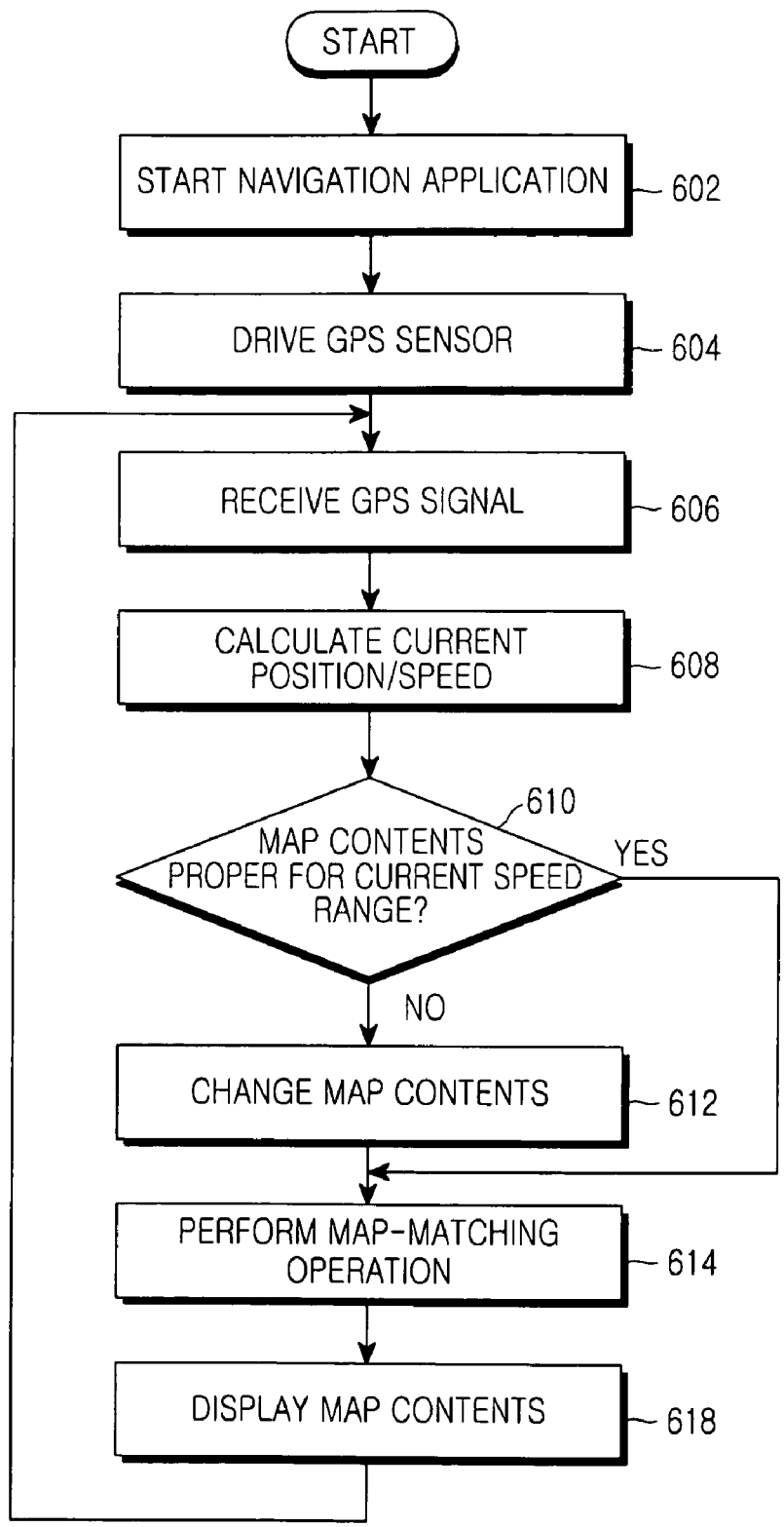
FIG. 6 illustrates a flowchart of a control process for automatically setting map contents according to an exemplary embodiment of the present invention.

FIG. 6 illustrates a flowchart of a control process for automatically setting map contents according to an exemplary embodiment of the present invention.

Referring to FIG. 6, the user starts a navigation application through the user input unit of the GPS terminal. When a start input is received from the user, the application performs various initialization processes for operating navigation in step 602. When the initialization processes are completed, the GPS driver drives the GPS sensor to receive a GPS signal in step 604.

When step 604 is completed, the GPS sensor receives the GPS signal in a GPS reception period set to a default value at a first operation time in step 606. The GPS signal received by the GPS sensor is provided to the position/speed calculator through the GPS driver. The position/speed calculator measures a current position and speed of the GPS terminal from the received GPS signal in step 608. When step 608 is completed, the position/speed calculator provides speed data of the GPS terminal to the map content controller. The map content controller determines whether map contents corresponding to the current speed of the GPS terminal stored in the memory are the same as those currently displayed on a display in step 610.

When the map contents corresponding to the current speed of the GPS terminal are different from those currently displayed on the display, the map content controller changes the current map contents to the map contents corresponding to the current speed of the GPS terminal in step 612. When step 612 is completed, the map-matching operator performs a map-matching operation based on the changed map contents in step 614.

When the map contents corresponding to the current speed of the GPS terminal are the same as those currently displayed on the display, the current map contents are maintained and the transition to step 614 is made.

The map-matching operator matches the current position of the GPS terminal to a position on the map using position information provided from the position/speed calculator in step 614. The map-matching operator causes additional information and POI information to be displayed on the map. When step 614 is completed, the display provides the user with map contents on which the map-matching operation is completed by the map-matching operator in step 618. Also, when step 614 is completed, the control process returns to step 606 and the map contents may be fed back to the map content controller. The map content controller determines whether current map contents (second map contents) of each speed range are proper using the fed-back map contents (first map contents) in step 610. When the first map contents are different from the second map contents, the map content controller changes the first map contents to the second map contents. Accordingly, optimized map contents according to a current moving speed of the GPS terminal are automatically set in real time.

User convenience is maximized by displaying map contents optimized at a moving speed of a GPS terminal using a navigation system according to an exemplary embodiment of the present invention.

Next, a method for optimizing a GPS reception period and map contents by considering a moving speed of a GPS terminal according to an exemplary embodiment of the present invention will be described in detail.

Figure 4:
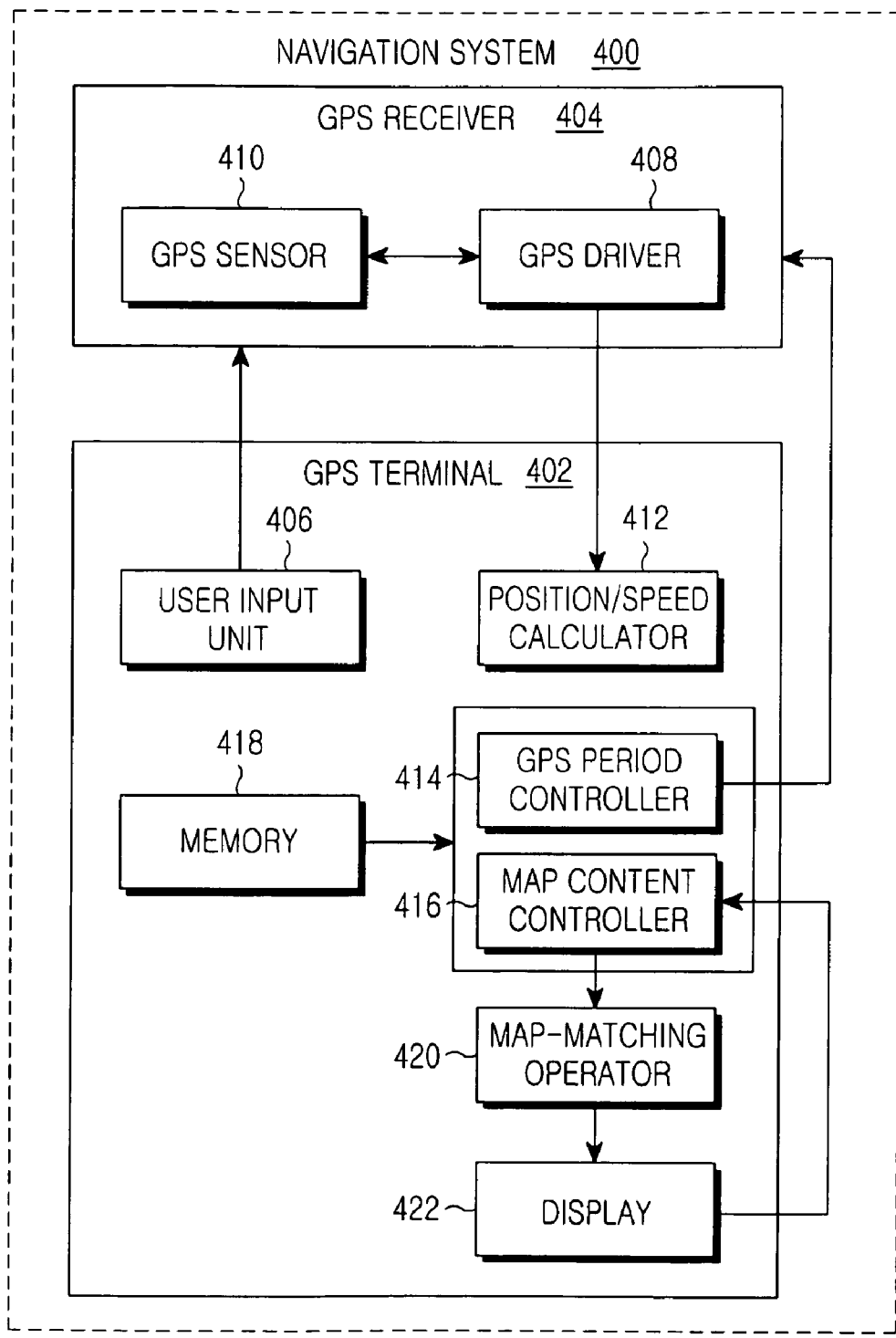
FIG. 4 illustrates a block diagram of a navigation system for automatically setting an optimized GPS reception period and optimized map contents according to an exemplary embodiment of the present invention.

FIG. 4 illustrates a block diagram of a navigation system for automatically setting an optimized GPS reception period and optimized map contents according to an exemplary embodiment of the present invention.

Referring to FIG. 4, a navigation system 400 includes a GPS receiver 404 and a GPS terminal 402. The GPS receiver 404 includes a GPS driver 408 and a GPS sensor 410. The GPS terminal 402 includes a user input unit 406, a position/speed calculator 412, a GPS period controller 414, a map content controller 416, a memory 418, a map-matching operator 420, and a display 422.

First, the user starts a navigation application through the user input unit 406 of the GPS terminal 402. When a start input is received from the user, the application performs various initialization processes for operating navigation.

The user selects a mode through the user input unit 406 after determining whether to automatically set a GPS reception period and map contents by considering an environment of the user. A manual mode in which the user directly inputs a pedestrian or car mode according to use purpose is the same process as an existing navigation system. Hereinafter, a mode for automatically setting a GPS reception period and map contents will be described.

When the initialization processes are completed, the navigation system 400 starts an operation for providing a navigation function.

The GPS driver 408 controls the overall operation of the GPS receiver 404. Specifically, the GPS driver 408 controls the GPS sensor 410 to receive a GPS signal in a set GPS reception period. The GPS reception period is set to one of an initial GPS reception period and an optimized GPS reception period.

Under control of the GPS driver 408, the GPS sensor 410 receives a GPS signal from an artificial satellite in the set GPS reception period.

The GPS signal received by the GPS sensor 410 is provided to the GPS terminal 402 through the GPS driver 408. The GPS signal is provided to the position/speed calculator 412 included in the GPS terminal 402.

The position/speed calculator 412 measures a current position and speed of the GPS terminal 402 from the GPS signal. Data of the measured current speed of the GPS terminal 402 is used as an important element for determining an optimal GPS reception period. The position/speed calculator 412 provides the measured current speed data to the GPS period controller 414.

The GPS period controller 414 determines the optimal GPS reception period by the measured current speed data. Here, the optimal GPS reception period is a GPS reception period optimized by considering the current speed of the GPS terminal 402.

In response to a request from the GPS period controller 414, the memory 418 provides an optimal GPS reception period corresponding to a current speed of the GPS terminal 402 to the GPS period controller 414.

The GPS period controller 414 determines whether a reception period (hereinafter, referred to as "first GPS reception period") currently set to receive the GPS signal is an optimal GPS reception period when considering the current speed of the GPS terminal 402.

That is, the GPS period controller 414 determines whether the optimal GPS reception period (hereinafter, referred to as "second GPS reception period) provided from the memory 418 is the same as the first GPS reception period.

When the first GPS reception period is different from the second GPS reception period, the GPS period controller 414 sets the second GPS reception period to the optimal GPS reception period. Conversely, when the first GPS reception period is the same as the second GPS reception period, the GPS period controller 414 maintains the first GPS reception period as the optimal GPS reception period.

The GPS period controller 414 provides the optimal GPS reception period to the GPS, receiver 404. The GPS receiver 404 can receive a GPS signal in the optimized GPS reception period corresponding to the speed of the GPS terminal 402.

The position/speed calculator 412 provides the measured speed data of the GPS terminal to the map content controller 416. The map content controller 416 determines whether current map contents corresponding to the current speed of the GPS terminal are optimal. That is, it is determined whether the current map contents match optimal map contents corresponding to the current speed of the GPS terminal.

When the map contents corresponding to the current speed of the GPS terminal are not optimized, the map content controller 416 changes the current map contents to the optimal map contents corresponding to the current speed of the GPS terminal.

The optimal map contents corresponding to the current speed of the GPS terminal can be accessed from the memory 418.

Conversely, when the map contents corresponding to the current speed of the GPS terminal are optimized, the map content controller 416 maintains the current map contents.

Then, the map content controller 416 provides the map-matching operator 420 with the map contents corresponding to the current speed of the GPS terminal. The map-matching operator 420 matches the current position of the GPS terminal to a position on the map using position information provided from the position/speed calculator 412.

The map-matching operator 420 causes additional information and POI information to be displayed on the map. Map contents on which a map-matching operation is completed by the map-matching operator 420 are displayed to the user through the display 422. The map contents on which the map-matching operation is completed are fed back to the map content controller 416.

When the moving speed of the GPS terminal changes, the map content controller determines whether map contents (first map contents) to be displayed on the display are the same as map contents (second map contents) corresponding to the current speed of the GPS terminal. When the first map contents are different from the second map contents, the map content controller changes the first map contents to the second map contents. Accordingly, optimized map contents according to the current moving speed of the GPS terminal are automatically set in real time.

Figure 7:
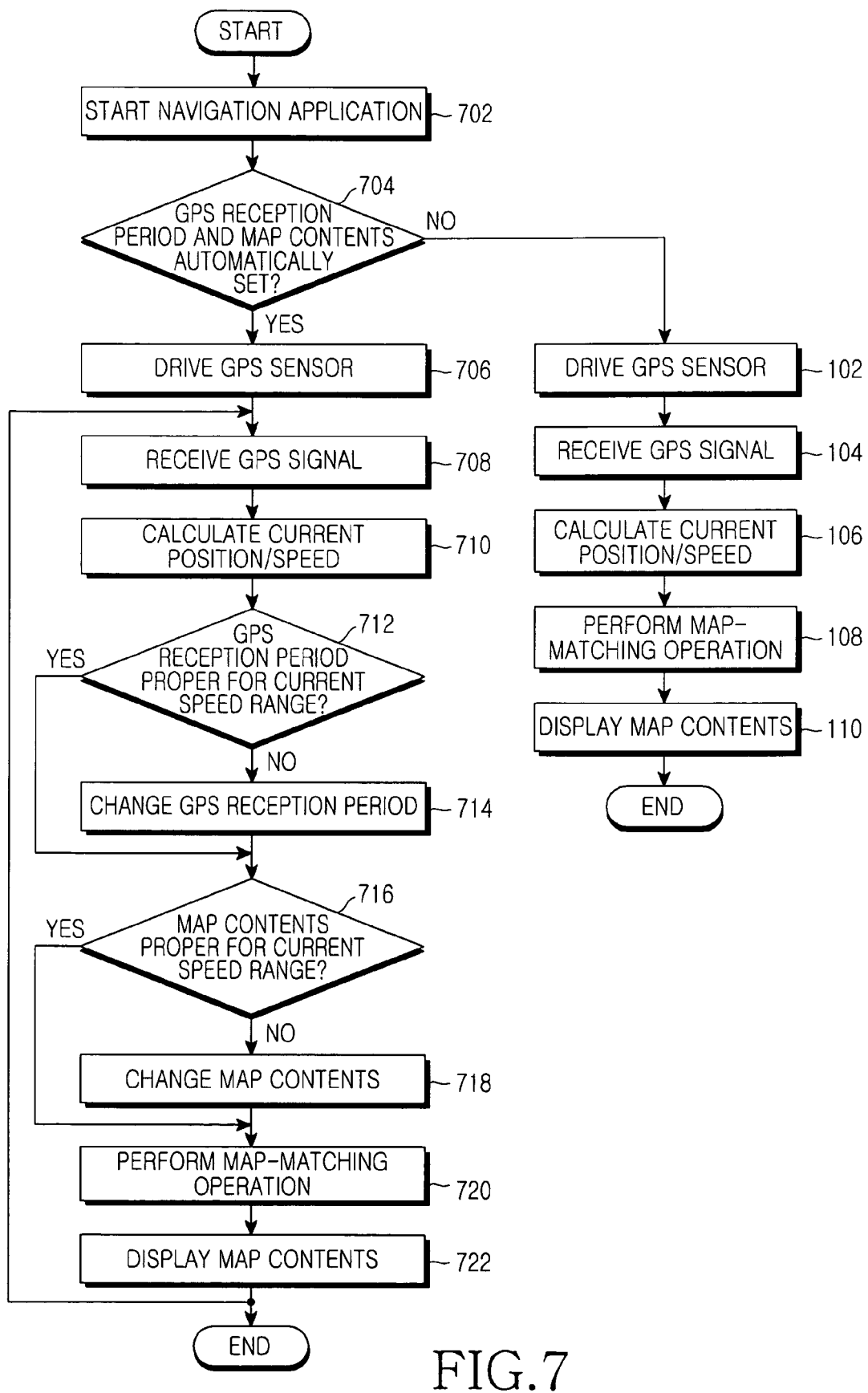
FIG. 7 illustrates a flowchart of a control process for automatically setting a GPS reception period and map contents according to an exemplary embodiment of the present invention.

FIG. 7 illustrates a flowchart of a control process for automatically setting a GPS reception period and map contents according to an exemplary embodiment of the present invention.

Referring to FIG. 7, the user starts a navigation application through the user input unit of the GPS terminal in step 702. When a start input is received from the user, the application performs various initialization processes for operating navigation.

When step 702 is completed, the user selects a user mode through the user input unit after determining whether to automatically or manually set a GPS reception period and map contents by considering a user environment in step 704. Those skilled in the art will appreciate that step 704 can be modified to be performed in any step according to an exemplary embodiment of the present invention so as to avoid a technical scope of the present invention.

Hereinafter, a mode in which a GPS reception period and map contents are automatically set according to a technical feature will be described.

When step 704 is completed, the GPS driver drives a GPS sensor to receive a GPS signal in step 706. The GPS sensor receives the GPS signal in a set GPS reception period in step 708. The GPS reception period is set to one of an initial GPS reception period and an optimized GPS reception period.

The GPS sensor receives the GPS signal in a GPS reception period set to a default value at a first operation time in step 708. However, when the GPS reception period is updated to the optimal GPS reception period by an operation to be described later, a GPS signal is received in the optimal GPS reception period. The GPS signal received by the GPS sensor is provided to the position/speed calculator through the GPS driver.

The position/speed calculator measures a current position and speed of the GPS terminal from the received GPS signal in step 710.

When step 710 is completed, the position/speed calculator provides speed data of the GPS terminal to the GPS period controller and the map content controller.

The GPS period controller determines whether the current GPS reception period is an optimal GPS reception period when current speed data of the GPS terminal is considered in step 712. That is, it is determined whether the optimal GPS reception period corresponding to the current speed of the GPS terminal stored in the memory is the same as the current GPS reception period (the default reception period or updated GPS reception period).

When the GPS reception period in which the current GPS signal is received is not proper to be the optimal GPS reception period corresponding to the current speed of the GPS terminal, the GPS period controller updates the current GPS reception period to the optimal GPS reception period corresponding to the current speed of the GPS terminal in step 714. Conversely, when the GPS reception period in which the current GPS signal is received is proper to be the optimal GPS reception period, the current GPS reception period is maintained.

When step 714 is completed, the map content controller determines whether map contents corresponding to the current speed of the GPS terminal stored in the memory are the same as those currently displayed on the display in step 716.

When the map contents corresponding to the current speed of the GPS terminal are different from those currently displayed on the display, the map content controller changes the current map contents to the map contents corresponding to the current speed of the GPS terminal in step 718.

Conversely, when the map contents corresponding to the current speed of the GPS terminal are the same as those currently displayed on the display, the current map contents are maintained and the transition to step 720 is made.

The map-matching operator matches the current position of the GPS terminal to a position on the map using position information provided from the position/speed calculator in step 720. The map-matching operator causes additional information and POI information to be displayed on the map.

When step 720 is completed, the display provides the user with map contents on which the map-matching operation is completed by the map-matching operator in step 722.

When step 722 is completed, the control process returns to step 708, and the current GPS reception period and map contents are provided to the GPS driver (or the GPS sensor) and the map content controller.

Then, when the moving speed of the GPS terminal changes, the GPS period controller determines whether a GPS reception period (first GPS reception period) received from the GPS sensor or the GPS driver is the same as a GPS reception period (second GPS reception period) corresponding to the current speed of the GPS terminal in step 712. When the first GPS reception period is different from the second GPS reception period, the GPS period controller changes the first GPS reception period to the second GPS reception period. The map content controller determines whether the fed-back map contents (first map contents) are the same as map contents (second map contents) corresponding to the current speed of the GPS terminal in step 716. When the first map contents are different from the second map contents, the map content controller changes the first map, contents to the second map contents. Accordingly, optimized map contents are automatically set according to the current moving speed of the GPS terminal in real time.

According to an aspect of the present invention, navigation system can automatically set an optimal GPS reception period and map contents according to a current speed of a GPS terminal and consider a current situation of a user, thereby increasing power efficiency by optimizing the GPS reception period in terms of hardware and decreasing system load by reducing an unnecessary system operation in terms of software.

According to an aspect of the present invention, a navigation system can maximize user convenience by optimizing map contents requested by a user according to a moving speed in real time and displaying the optimized map contents.

While the invention has been shown and described with reference to a certain preferred embodiment thereof, it will be understood by those skilled in the art that various changes in form and details may be made therein without departing from the spirit and scope of the invention as defined by the appended claims.

That is, while an example in which an optimal GPS reception period and map contents are automatically set in a navigation system using a GPS terminal has been described, it will be understood by those skilled in the art that the present invention may be applied to a mobile communication terminal and a personal digital assistant using a similar technical background and navigation without departing from the spirit and scope of the invention as defined by the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for automatically setting a navigation function in a navigation system having a Global Positioning System (GPS) receiver, the method comprising:
    displaying first map contents on a display;
    receiving a GPS signal through the GPS receiver in a first period;
    measuring a moving speed of a GPS terminal using the received GPS signal;
    updating the first period by considering the first period and a second period based on the measured moving speed of the GPS terminal;
    identifying the second period using a table including a selected reception period mapped to each of a plurality of moving speed ranges; and
    displaying second map contents on the display, the second map contents corresponding to the measured moving speed of the GPS terminal, wherein the second map contents comprise an increasing level of detail for slower measured moving speeds, and when the measured moving speed is less than a threshold speed, map details for a pedestrian mode are included in the second map contents.

2. The method of claim 1, wherein updating the first period includes:
    determining the second period corresponding to the measured moving speed of the GPS terminal;
    comparing the first period to the determined second period; and
    updating the first period when the first period is different from the second period.

3. The method of claim 1, wherein the second period is an optimized reception period corresponding to the measured moving speed of the GPS terminal and the first period is updated to the second period.

4. The method of claim 3, further comprising: providing the updated first period to the GPS receiver.

5. The method of claim 3, wherein the optimized reception period corresponding to the measured moving speed of the GPS terminal is preset according to each moving speed range.

6. The method of claim 1, further comprising: adjusting the first map contents by considering the first map contents currently displayed on the display, wherein the adjusted first map contents are the second map contents.

7. The method of claim 6, wherein adjusting the first map contents includes:

determining the second map contents corresponding to the measured moving speed of the GPS terminal;

comparing the first map contents currently displayed on the display to the determined second map contents; and adjusting the first map contents by considering the second map contents when the first map contents are different from the second map contents.

8. The method of claim 1, further comprising:

performing a map-matching operation on the adjusted first map contents and providing a map-matching result to the display.

9. A navigation system comprising:

a GPS receiver configured to receive a GPS signal in a first period; and a GPS terminal configured to display first map contents on a display; update the first period by measuring a moving speed using the received GPS signal and considering the first period and a second period based on the measured moving speed; identify the second period using a table including a selected reception period mapped to each of a plurality of moving speed ranges; and display second map contents on the display, the second map contents corresponding to the measured moving speed of the GPS terminal, wherein the second map contents comprise an increasing level of detail for slower measured moving speeds, and when the measured moving speed is less than a threshold speed, map details for a pedestrian mode are included in the second map contents.

10. The navigation system of claim 9, wherein when the first period is different from the second period, the GPS terminal is further configured to update the first period.

11. The navigation system of claim 9, wherein the GPS terminal is further configured to update the first period to the second period, which is the optimized reception period corresponding to the measured moving speed.

12. The navigation system of claim 11, wherein the GPS terminal is further configured to provide the updated first period to the GPS receiver.

13. The navigation system of claim 9, wherein the GPS terminal comprises:

a map content controller configured to adjust the first map contents by considering the first map contents currently displayed on the display, wherein the adjusted first map contents are the second map contents.

14. The navigation system of claim 9, wherein the GPS terminal includes:

a position/speed calculator configured to measure a current speed and position using the received GPS signal; and a reception period controller configured to update the first period when the first period is different from the second period corresponding to the current speed measured by the position/speed calculator.

15. The navigation system of claim 14, wherein the reception period controller is further configured to update the first period to the second period, which is an optimized reception period corresponding to the measured current speed.

16. The navigation system of claim 15, wherein the reception period controller is further configured to provide the updated first period to the GPS receiver.

17. A navigation system comprising:

a GPS receiver configured to receive a GPS signal in a first period; and a GPS terminal configured to measure a moving speed using the received GPS signal, update the first period by considering the first period and a second period based on the measured moving speed, and adjust first map contents by considering the first map contents currently displayed on a display and second map contents based on the measured moving speed; and display the second map contents corresponding to the measured moving speed of the GPS terminal on the display, wherein the adjusted first map contents are the second map contents, wherein the second map contents comprise an increasing level of detail for slower measured moving speeds, and when the measured moving speed is less than a threshold speed, map details for a pedestrian mode are included in the second map contents.

18. The navigation system of claim 17, wherein the GPS terminal includes:

a position/speed calculator configured to measure a current speed and position using the received GPS signal;

a GPS period controller configured to update the first period when the first period is different from the second period corresponding to the current speed measured by the position/speed calculator; and a map content controller configured to adjust the first map contents by considering the second map contents when the first map contents currently displayed on the display are different from the second map contents corresponding to the current speed measured by the position/speed calculator.

19. The navigation system of claim 18, wherein the GPS terminal includes:

a map-matching operator configured to match the position measured by the position/speed calculator and associated information with the adjusted first map contents; and the display configured to display the matched map contents to a user.

20. A method for automatically setting a navigation function in a navigation system having a GPS receiver, comprising:

measuring a moving speed of a GPS terminal using a GPS signal received through the GPS receiver;

adjusting, by the GPS terminal, first map contents by considering the first map contents currently displayed on a display and second map contents based on the measured moving speed of the GPS terminal; and displaying the second map contents on the display, wherein the adjusted first map contents are the second map contents, wherein the second map contents comprise an increasing level of detail for slower measured moving speeds, and when the measured moving speed is less than a threshold speed, map details for a pedestrian mode are included in the second map contents.

21. The method of claim 20, wherein the first map contents are adjusted so that a precision of a map and an amount of additional information displayed on the map are reduced, respectively.

22. The navigation system of claim 17, wherein the first map contents are adjusted so that a precision of a map and an amount of additional information displayed on the map are reduced, respectively.

* * * * *